C. B. Lewis,
Treadle.

No. 53,312.  Patented Mar. 20, 1866.

Witnesses

Inventor

UNITED STATES PATENT OFFICE.

CHARLES B. LEWIS, OF CLIFTON, OHIO.

IMPROVEMENT IN MECHANICAL MOVEMENTS.

Specification forming part of Letters Patent No. 53,312, dated March 20, 1866.

*To all whom it may concern:*

Be it known that I, CHARLES B. LEWIS, of Clifton, in the county of Greene and State of Ohio, have invented a new and useful Improvement in Mechanical Movements; and I do hereby declare that the following is a full, clear, and exact description thereof, which will enable others skilled in the art to make and use the same, reference being had to the accompanying drawings, forming part of this specification, in which—

Figure 1:
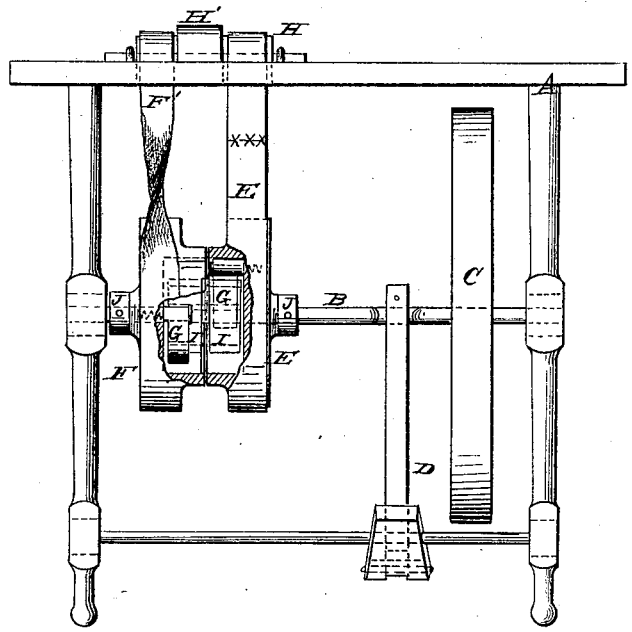
Figure 2:
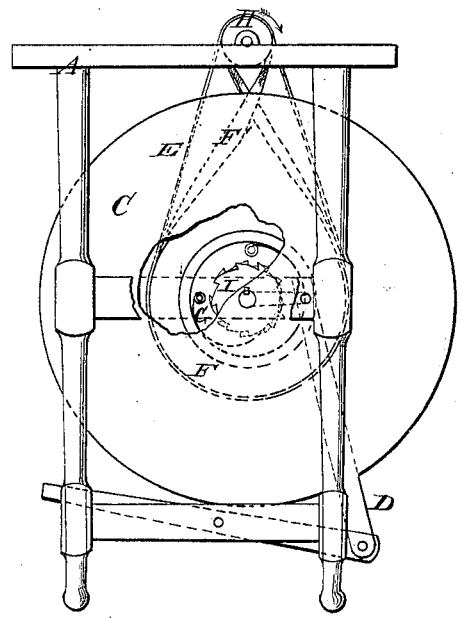

Figure 1 is an elevation, partly in section, of a mechanical movement made according to my invention, showing how it is applied to rotate a shaft constantly in the same direction. Fig. 2 is an end view thereof.

Similar letters of reference indicate like parts.

This invention consists in causing a shaft or pulley to rotate constantly in the same direction without regard to the direction which may be given to the driving-shaft. The utility of the invention will be understood from the inconvenience experienced in operating sewing-machines when the balance-wheel starts in the wrong direction.

In carrying out the improvement two independent belt-pulleys are placed loosely on a driving-shaft, being held from moving endwise thereon by means of collars or other suitable devices. A separate belt is carried from each pulley around the shaft to be rotated, one of said belts being crossed. Within the hollow hub of each pulley is a detent, extending in opposite directions, which engage with ratchets formed on the shaft. The detents are kept in engagement with the ratchets by springs, or the detents may themselves be made elastic and so arranged as to bear on the ratchets. In starting the treadle it will not matter which way the main shaft is turned, because only one of the pulleys thereon will be rotated with it.

In the illustration here given of my invention I have shown a main shaft, B, supported in a frame, A, in the top of which is placed a short shaft, H, revolving in suitable bearings. The latter shaft has at its center a pulley, H', by means of which motion can be communicated to machinery in the usual way—that is to say, by a belt or by frictional contact with another pulley; or a gear-wheel may be put on said shaft H in the stead of pulley H'.

C designates a balance-wheel on said shaft, and D a treadle for turning the shaft. The letters E F designate two pulleys placed side by side and held in place on the shaft B, so that they cannot move endwise thereon by means of collars J J. The ends of the hubs of said pulleys which are adjacent to each other are enlarged in diameter over their outer ends, so as to make them large enough to allow circular cavities to be made in them, as is illustrated in Fig. 2, where the hub of one of the pulleys is broken away to show this construction. Around those parts of the shaft B which are opposite said circular cavities I fix ratchets I, one within each pulley, which ratchets have their angles facing in opposite directions, and are severally engaged by detents G fastened within the hollow parts of the hubs of the pulleys. It is evident that when the shaft is rotated in a stated direction the teeth of one of its ratchets will become engaged with one of the detents G and cause the pulley to which such detent is attached to revolve, while the teeth of the other ratchet revolve beneath the detent of the other pulley without being engaged by it. A belt, E', is taken from pulley E to a pulley formed on one end of the shaft H, which is to be rotated only in one direction, and a like belt, F', is taken from pulley F to another pulley on the same shaft. The pulleys on said shaft, which receive the belts E' F', are in this example placed on either side of the pulley H' at the middle of its length, so as to make the shaft H run steady. The belts E' F' will communicate to shaft H the like rotary motions, respectively, of their pulleys E F, and since the pulley F will only be rotated directly from the shaft B when the shaft is turned in a direction contrary to that in which it will rotate pulley E, it follows that the shaft H would be rotated by the belt F' from pulley F in a like contrary direction. This result is, however, prevented by crossing the said belt F', by which arrangement the shaft H is turned in a direction contrary to the direction of rotation of pulley F. It will be observed that power from the shaft B is communicated to only one of the pulleys E F at the same time, because one of the ratchets I will run freely under the detent of one of the pulleys when the other is engaged by the detent of that pulley which is the working one for the time being; but the belt of the idle pulley will be carried along by frictional contact with its pulley on shaft H, and consequently both of the pullyes, E F, will always be rotated in the same direction, although the direction of rotation of shaft B may be changed.

This mechanical movement may be applied to sewing-machines with good results, and to other machines where it is desirable to keep up motion in the same direction.

The ratchets I of the mechanism are covered in the hollow hubs of the working-pulleys, and the bored or hollow ends of the latter are placed together, so as to prevent danger from liability of catching a lady's dress or of catching the work being done about any machine to which my improvement is applied.

The springs which press the detents against the ratchets, or the detents themselves when they are made elastic, should not be made very strong on account of the noise which they would make in running over the ratchets.

The ratchets I may be formed on the pulleys E F and the detents or parts be placed on the shaft B, if desired.

I claim as new and desire to secure by Letters Patent—

The mechanical movement, constructed substantially as above described, for causing rotary motion constantly in the same direction from a main shaft without regard to the direction of rotation of the latter, composed of two independent pulleys, loose on the main shaft and driven therefrom by means of ratchets and pawls or detents, or by their equivalents, for each pulley, working from opposite directions, both pulleys being connected by belts, one of which is crossed, to the shaft, whose motion is to be constantly in the same direction.

CHARLES B. LEWIS.

Witnesses:
   E. B. LEWIS,
   BENNET LEWIS.